(12) United States Patent
Bones (10) Patent No.: US 8,333,827 B2
(45) Date of Patent: Dec. 18, 2012

(54) ADSORPTION FILTER MATERIAL, ESPECIALLY A PERMEABLE BARRIER LAYER COMPOSITE WITH AN ADSORBENT, AND THE USE THEREOF

(75) Inventor: Benedikt Bones, Erkrath (DE)

(73) Assignee: Blucher GmbH, Erkrath (DE)

( * ) Notice: Subject to any disclaimer, the term of this patent is extended or adjusted under 35 U.S.C. 154(b) by 292 days.

(21) Appl. No.: 12/743,702

(22) PCT Filed: Oct. 2, 2008

(86) PCT No.: PCT/EP2008/008370
§ 371 (c)(1),
(2), (4) Date: Aug. 30, 2010

(87) PCT Pub. No.: WO2009/065464
PCT Pub. Date: May 28, 2009

(65) Prior Publication Data
US 2010/0313759 A1    Dec. 16, 2010

(30) Foreign Application Priority Data

Nov. 20, 2007  (DE) .......................... 10 2007 055 586
Dec. 13, 2007  (DE) .......................... 10 2007 060 580
Dec. 24, 2007  (DE) .......................... 10 2007 062 667

(51) Int. Cl.
*B01D 53/04* (2006.01)
*A62D 5/00* (2006.01)

(52) U.S. Cl. ......................................... 96/152; 442/122

(58) Field of Classification Search .................... 96/134, 96/139, 152, 154; 95/90, 141; 442/122; 2/455; 55/DIG. 33
See application file for complete search history.

(56) References Cited

U.S. PATENT DOCUMENTS

| | | | | |
|---|---|---|---|---|
| 3,101,709 A * | 8/1963 | Gruenewaelder | ........ | 128/206.12 |
| 3,744,222 A * | 7/1973 | Delao | ............... | 55/446 |
| 3,965,695 A * | 6/1976 | Rush et al. | ........... | 62/271 |
| 4,419,107 A * | 12/1983 | Roydhouse | ........... | 95/59 |
| 5,538,542 A * | 7/1996 | Watanabe et al. | ........... | 96/131 |
| 6,475,270 B1* | 11/2002 | Graeve | ................ | 96/135 |
| 8,048,371 B1* | 11/2011 | Kapur et al. | ............ | 422/50 |
| 2004/0237790 A1* | 12/2004 | von Blucher et al. | ........ | 96/154 |
| 2005/0266749 A1* | 12/2005 | De Ruiter | ............ | 442/59 |
| 2007/0059504 A1* | 3/2007 | von Blucher | ............ | 428/220 |
| 2007/0065658 A1* | 3/2007 | Bohringer et al. | ........... | 428/323 |
| 2007/0134483 A1* | 6/2007 | Bohringer et al. | ........ | 428/297.4 |
| 2007/0240576 A1* | 10/2007 | von Blucher et al. | ........ | 96/154 |

* cited by examiner

*Primary Examiner* — Frank Lawrence, Jr.
(74) *Attorney, Agent, or Firm* — Brannon Robinson PC (57) ABSTRACT

The invention relates to an adsorption filter material with a multilayer construction, particularly with a permeable adsorptive barrier layer composite, preferably for ABC protective clothing, wherein the adsorption filter material has at least a first barrier layer having a plurality of openings and at least a second barrier layer having a plurality of openings, as well as an adsorption layer disposed between the first and second barrier layers, wherein the first and second barrier layers are disposed in such a manner, that the openings and the openings do not overlap and/or do not coincide. The adsorption filter material is very comfortable and, at the same time, offers excellent protection against chemical poisons.

18 Claims, 5 Drawing Sheets

ADSORPTION FILTER MATERIAL, ESPECIALLY A PERMEABLE BARRIER LAYER COMPOSITE WITH AN ADSORBENT, AND THE USE THEREOF

CROSS-REFERENCES TO RELATED APPLICATIONS

This application is a National Stage filing of International Application PCT/EP2008/00008370, filed Oct. 2, 2008, claiming priority to German Applications No. DE 10 2007 055 586.7 filed Nov. 20, 2007, DE 10 2007 060 580.5 filed Dec. 13, 2007, and DE 10 2007 062 667.5 filed Dec. 24, 2007 entitled ADSORPTION FILTER MATERIAL, ESPECIALLY A PERMEABLE BARRIER LAYER COMPOSITE WITH AN ADSORBENT, AND THE USE THEREOF." The subject application claims priority to PCT/EP2008/008370, and to German Applications No. DE 10 2007 055 586.7, DE 10 2007 060 580.5, and DE 10 2007 062 667.5

BACKGROUND OF THE INVENTION

The present invention relates to a permeable, more particularly gas/air pervious blocking layer composite with adsorbent and to use thereof.

More particularly, the present invention relates to an adsorptive filtering material, more particularly a blocking layer composite, as classified in the preamble of claim 1, that is useful in particular for the production of protective materials of any kind (such as, for example, protective suits, protective gloves, protective footwear and other protective apparel pieces and also protective coverings, for example for ambulance services, tents, sleeping bags and the like) and also for the production of filters and filtering materials and thus not only for the military but also the civilian sector, more particularly for NBC deployment.

The present invention further relates to the process for producing the adsorptive filtering material of the invention.

The present invention further relates to protective materials as such, that include the adsorptive filtering material of the present invention or are produced using the adsorptive filtering material of the present invention. The present invention also relates to filters and filtering materials as such, that include the adsorptive filtering material of the present invention or are produced using the adsorptive filtering material of the present invention.

The present invention further relates to the use of this adsorptive filtering material, more particularly blocking layer composite, in the aforementioned protective materials and in the above-described filters and filtering materials and also to the aforementioned protective materials and the aforementioned filters and filtering materials themselves.

There are a whole series of molecular entities which are absorbed by the skin and lead to serious physical noxae. Examples include the vesiccatory mustard gas (Yellow Cross) and the nerve gas sarin. People likely to come into contact with such poisons must wear a suitable protective apparel or be protected against these poisons by suitable protective materials.

Known for this purpose are for example air and water vapor impervious protective suits which are equipped with a rubber layer impervious to chemical poisons. The disadvantage here is that these suits very quickly lead to a buildup of heat, since they are air and water vapor impervious. Disadvantages here are the nonexistent breathability and also the nonexistent exchange of air.

The prior art additionally includes such protective suits as are constructed to be air impervious yet water vapor pervious/breathable. Protective suits of this kind generally include a membrane which acts as an air impervious yet water vapor pervious/breathable blocking layer and which may optionally be supplemented on its inside surface by an adsorbent (adsorptive filtering material) in order that adequate protection may be continued to be ensured in the event of any damage to the membrane. However, protective suit systems of this kind are not always able—particularly not under deployment conditions involving physical exertion—to ensure adequate breathability, so that wearing comfort is occasionally impaired as a consequence of the lack of air exchange.

Protective suits against chemical warfare agents, which are conceived for prolonged deployment under a variety of conditions, however, must not cause the wearer to suffer any heat buildup. Therefore, air and water vapor pervious protective suits are known for this purpose because they offer the highest wearing comfort.

The air pervious, permeable protective suits possess an adsorptive filtering layer with activated carbon, which binds the chemical poisons very durably, so that even strongly contaminated suits do not pose any danger to the wearer. The great advantage of systems of this kind is that the activated carbon is accessible on the inside surface as well as the outside surface, so that poisons which have succeeded in penetrating at damaged or otherwise nontight locations can be very rapidly adsorbed. Under extreme conditions, more particularly when a drop of a thickened poisonous or warfare agent material lands from a considerable height on the protective suit material and strikes through to the activated carbon, the layer of activated carbon can be locally overtaxed.

The adsorptive layer in the above-described, air pervious, permeable protective suits can be engineered such that, for example, either particles, more particularly granules or spherules, of activated carbon which are on average up to about 2.0 mm in size are bound to small accumulations of adhesive which have been printed onto a textile backing material, or alternatively that a reticulated polyurethane foam impregnated with a carbon paste of binder and activated carbon is used as adsorptive layer, in which case the adsorptive layer is generally supplemented by an outer (i.e., a covering material) and the wearer-facing inside surface is in turn covered by a lightweight textile material.

However, the prior art further includes composites comprising an activated carbon fiber fabric, for example a woven or nonwoven activated carbon fiber fabric (cf. for example WO 94/01198 A1 or its descendant EP 0 649 332 B1 or EP 0 230 097 A2).

This is because, owing to its highly non-specific adsorptive properties, activated carbon is the most widely used adsorbent. Activated carbon is generally obtained by carbonization and subsequent activation of carbonaceous starting compounds, preferably carbonaceous starting compounds which lead to economically sensible yields (cf. for example H. v. Kienle and E. Bäder, "Aktivkohle and ihre industrielle Anwendung", Enke Verlag Stuttgart, 1980).

BRIEF SUMMARY OF THE INVENTION

The present invention, then, has for its object to provide an adsorptive filtering material or adsorptive protective material, which at least substantially avoids or ameliorates the above-described disadvantages of the prior art.

More particularly, such an adsorptive filtering material should be useful for the production of NBC protective materials (such as, for example, protective suits, protective gloves, protective footwear and other protective apparel pieces and also protective coverings, sleeping bags and the like) or of filters and filtering materials. More particularly, the adsorptive properties shall be custom tailorable to the intended use.

The present invention further has for its object to provide an adsorptive filtering material which in addition to a high perviousness to gas, more particularly air, and a high perviousness to water vapor, ensures a protective function in respect of chemical and biological noxiants and poisons, more particularly chemical and biological warfare agents.

The present invention further has for its object to provide an adsorptive filtering material that is suitable particularly for use in protective materials (such as, for example, protective suits, protective gloves, protective footwear and other protective apparel pieces and also protective coverings, sleeping bags and the like) and in this use ensures a high wearing comfort.

The present invention finally further has for its object to provide an adsorptive filtering material which is suitable particularly for use in filters and filtering materials (such as, for example, for removing noxiant, odorant and toxicant materials of any kinds, more particularly from air and/or gas streams, such as NBC protective mask filters, odor filters, sheet filters, air filters, more particularly filters for indoor air cleaning, adsorption-capable backing structures and filters of the medical sector) and in this use ensures good filtering efficiency.

To achieve this object, the present invention proposes—in accordance with a first aspect of the present invention—an adsorptive filtering material of multilayered construction, more particularly a permeable adsorptive blocking layer composite according to claim 1. Further advantageous elaborations of the adsorptive filtering material of the present invention are subject matter of subsidiary claims.

The present invention further provides—in accordance with a next aspect of the present invention—the process for producing the adsorptive filtering material of the invention, wherein a first blocking layer that includes a multiplicity of perforations and at least one second blocking layer that includes a multiplicity of perforations and also an adsorptive layer arranged between these blocking layers are connected together to form an adsorptive filtering material such that the perforations of the first blocking layer do not overlap the perforations of the second blocking layer, and/or the respective perforations are arranged noncongruently.

The present invention further provides—in accordance with a further aspect of the present invention—protective materials, more particularly protective suits, protective gloves, protective footwear and other protective apparel pieces and also protective coverings, sleeping bags and the like, that are produced using the present invention adsorptive filtering material of multilayered construction, more particularly the permeable adsorptive blocking layer composite of the present invention, and/or include the present invention adsorptive filtering material of multilayered construction, more particularly the blocking layer composite.

The present invention yet further provides—in accordance with a yet further aspect of the present invention—filters and filtering materials, more particularly for removing noxiant, odorant and toxicant materials of any kind, more particularly from air and/or gas streams, such as NBC protective mask filters, odor filters, sheet filters, air filters, more particularly filters for indoor air cleaning, adsorption-capable backing structures and filters for the medical sector, produced using the present invention adsorptive filtering material of multilayered construction, more particularly the permeable adsorptive blocking layer composite, and/or include the present invention adsorptive filtering material, more particularly the blocking layer composite.

The present invention additionally further provides—in accordance with a yet further aspect of the present invention—the use of the present invention adsorptive filtering material of multilayered construction, more particularly of the permeable adsorptive blocking layer composite, for producing protective materials of any kind, such as protective suits, protective gloves, protective footwear and other protective apparel pieces and also protective coverings, sleeping bags, tents and the like, preferably for NBC deployment, not only for civilian but also military applications.

The present invention finally further provides—in accordance with yet a further aspect of the present invention—the use of the adsorptive filtering material of the present invention for producing filters and filtering materials of any kind, more particularly for removing noxiant, odorant and toxicant materials of any kind, more particularly from air and/or gas streams, such as in particular NBC protective mask filters, odor filters, sheet filters, air filters, more particularly filters for indoor air cleaning, adsorption-capable backing structures and filters for the medical sector.

It will be understood that elaborations, embodiments, advantages and the like that are recited herein in relation to one aspect of the invention only to avoid repetition do of course also apply in relation to the other aspects of the invention.

The present invention—in accordance with a first aspect of the present invention—accordingly provides an adsorptive filtering material of multilayered construction, more particularly a permeable adsorptive blocking layer composite, preferably for NBC protective apparel. The adsorptive filtering material of the present invention is characterized in that the adsorptive filtering material includes at least one first blocking layer that includes a multiplicity of perforations and at least one second blocking layer that includes a multiplicity of perforations and also an adsorptive layer arranged between the first blocking layer and the second blocking layer. The adsorptive filtering material of the present invention is further characterized in that the first blocking layer and the second blocking layer are arranged such that the perforations of the first blocking layer and the perforations of the second blocking layer are nonoverlapping and/or noncongruent.

It must accordingly be considered a central idea of the present invention for the adsorptive filtering material of the present invention to utilize specific blocking layers that each have perforations and for the blocking layers to be arranged in the adsorptive filtering material such that, in a plan view of the main extension plane of the adsorptive filtering material of the present invention, the perforations of the respective blocking layers are mutually offset and do not overlap/are noncongruent in the projection plane. In other words, the perforations of the first blocking layer and the perforations of the second blocking layer are arranged such that these, in the projection plane, do not have a common section and are arranged with a certain offset relative to each other.

Owing to the specific present invention conception of the adsorptive filtering material according to the invention there is provided a gas or air pervious material wherein, owing to the specific arrangement of the perforations, a direct flow of gas or air through the adsorptive filtering material in a direction transverse to the main extension plane is avoided. The present invention accordingly provides for a lengthening or enlarging of the diffusive or convective path of the gas or air flowing therethrough, more particularly involving a slowing of the flow rate, so that altogether the adsorptive performance is significantly improved. This will be discussed in greater detail in what follows.

The adsorptive filtering material of the present invention has the decisive advantage that it combines, in one material so to speak, the diametrically opposed properties of a high protective function in respect of chemical toxicant and warfare agent materials on the one hand and a high wearing comfort due to the defined gas/air perviousness. The adsorptive filtering material of the present invention is therefore particularly useful for military deployment, more particularly in conjunction with physical exertions, since the gas/air perviousness of the adsorptive filtering material of the present invention ensures, in addition to the high protective function in respect of chemical toxicant and warfare agent materials, a high wearing comfort due to the effective removal of water vapor resulting from the sweating of the wearer. In this context, the material of the blocking layers per se, i.e., the region between the perforations, is at least essentially air impervious and water impervious, but preferably water vapor pervious, so that this results in an additional protective function in respect of chemical toxicant and warfare agent materials. The protective functions are further improved by the presence of the adsorptive layer.

DETAILED DESCRIPTION OF THE INVENTION

Figure 1A:
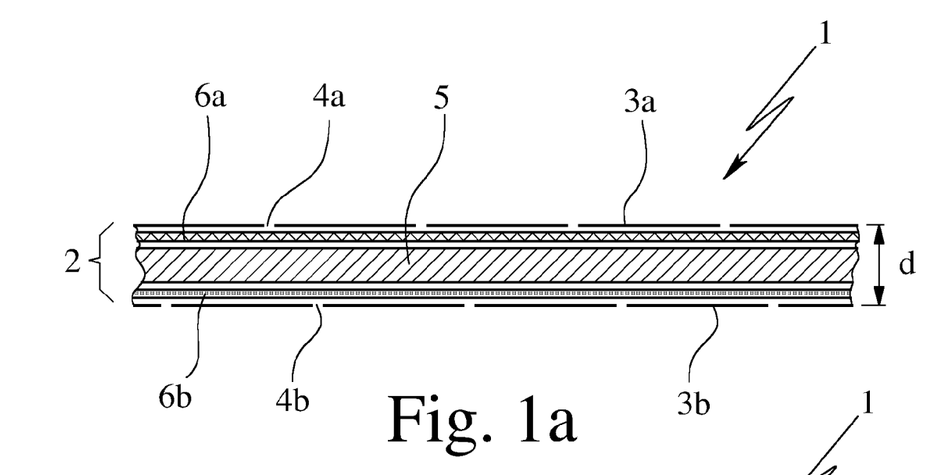
FIG. 1a shows a schematic sectional depiction of the present invention adsorptive filtering material wherein the adsorptive layer is configured in the manner of a sheet material.
Figure 1B:
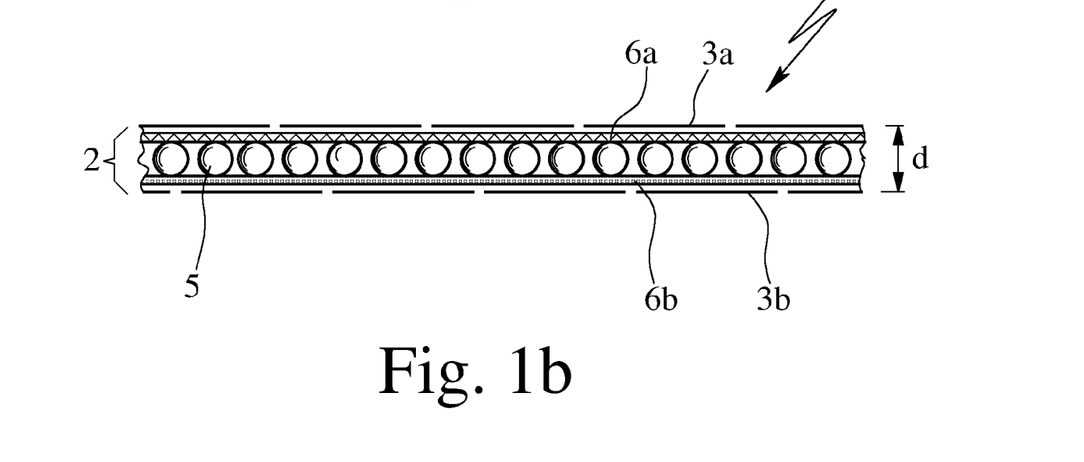
FIG. 1b shows a schematic sectional depiction of the present invention adsorptive filtering material wherein the adsorptive layer includes spherical adsorbents.
Figure 2:
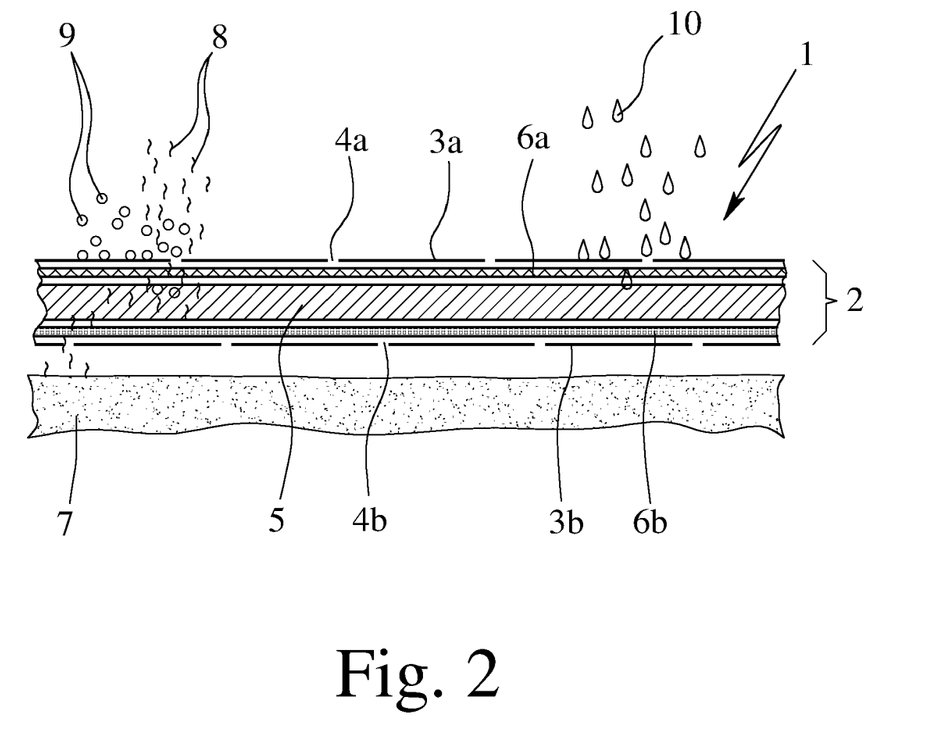
FIG. 2 shows a schematic sectional depiction of the inventive adsorptive filtering material whereby the functioning of the adsorptive filtering material of the present invention is illustrated.

Further advantages, features, properties and aspects of the present invention will become apparent from the following description of a preferred embodiment with reference to the drawings, where FIG. 1a, FIG. 1b and FIG. 2 show the present invention adsorptive filtering material 1 of multilayered construction 2, more particularly the permeable adsorptive blocking layer composite of the invention, preferably for NBC protective apparel. As FIG. 1a, FIG. 1b and FIG. 2 show, the adsorptive filtering material 1 of the invention includes at least one first blocking layer 3a that includes a multiplicity of perforations 4a and at least one second blocking layer 3b that includes a multiplicity of perforations 4b and also an adsorptive layer 5 arranged between the first blocking layer 3a and the second blocking layer 3b, where the first blocking layer 3a and the second blocking layer 3b are arranged such that the perforations 4a and the perforations 4b are nonoverlapping and/or noncongruent.

Figure 3:
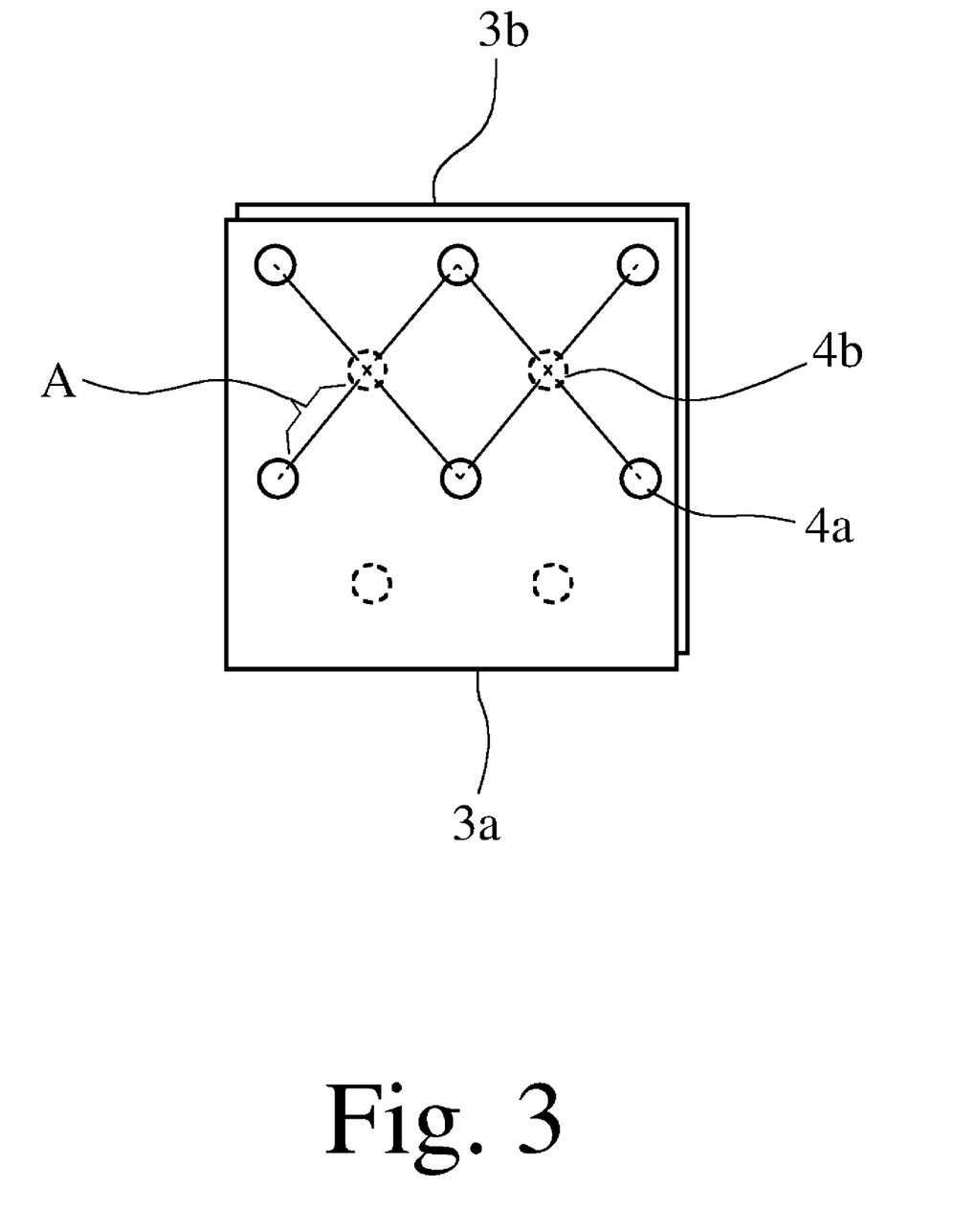
FIG. 3 shows a plan view of the main extension plane of the inventive adsorptive filtering material, illustrating the arrangement of the perforations.

As far as the arrangement of the perforations 4a, 4b is further concerned, FIG. 1a, FIG. 1b and FIG. 3 reveal that the perforations 4a and the perforations 4b are arranged nonoverlappingly and/or noncongruently and/or offset relative to each other in the projection plane.

For the purposes of the present invention, the term "projection plane" is to be understood as referring to the illustrative superposition of the first blocking layer 3a and the second, blocking layer 3b that in principle is also present, by inclusion of the adsorptive layer 5 at least, in the present invention adsorptive filtering material 1. The two blocking layers 3a, 3b are—as shown in FIG. 3—projected onto each other so to speak, so that this schematic arrangement can be used to illustrate the concept of the present invention whereby the perforations 4a and the perforations 4b are arranged in the adsorptive filtering material 1 of the present invention such that they are offset, so that there are no overlaps or congruences between the perforations 4a and the perforations 4b, and vice versa, in relation to the projection plane. The specific arrangement of the perforations 4a and the perforations 4b in the manner of the present invention is accordingly apparent when the adsorptive filtering material 1 is considered perpendicularly to the main extension plane, i.e., perpendicularly to the sheetlike spreading out of the adsorptive filtering material 1 of the present invention and therefore in a plan view of the main extension plane of the present invention adsorptive filtering material 1 as discernible for example from FIG. 3b schematically in respect of the blocking layers 3a, 3b.

In this connection, FIG. 2 illustrates the function of the present invention adsorptive filtering material 1: The perforations 4a and 4b, which are arranged in the opposite blocking layers 3a and 3b, which flank the adsorptive material or the adsorptive layer 5, constitute entry openings for gases or air in that—depending on the configuration of the present invention adsorptive filtering material 1—aerosols 9 and liquids 10 are at least essentially retained at the first blocking layer 3a already. Any aerosols 9 or liquids 10 which have succeeded in penetrating into the adsorptive filtering material 1—in the event of very severe contamination—are then retained by the adsorptive layer 5. Owing to the air or gas exchange, the high wearing comfort of the present invention adsorptive filtering material 1 is ensured in principle, since there is no buildup of heat and gaseous water vapor 8, which comes more particularly from the perspiration of the skin 7 of the wearer, can be efficiently transported away from the body of the wearer. The offset arrangement of the perforations 4a and 4b essentially ensures that a lengthening of the diffusive or convective paths along or through the present invention adsorptive filtering material 1 results, so that this significantly improves the adsorptive performance by the adsorptive layer 5, since it is contacted by the flowing air or the gases over a longer sector. In addition, the specific arrangement of the perforations 4a and 4b also provides for a slowing of the flow rate through the present invention adsorptive filtering material 1, lengthening the contact time of the air, gases, any aerosols or liquids or the like with the adsorptive layer 5.

In other words, the present invention realizes a lengthened diffusive and convective sector in relation to the air, gases flowing through the adsorptive filtering material 1 of the present invention and in relation to any penetrating aerosols/liquids, in that more particularly a direction of flow transversely to the main extension plane of the adsorptive filtering material 1 of the present invention also results. According to the present invention, therefore, any direct flow in the sense of a short path transversely through the adsorptive filtering material 1 of the present invention is prevented. The overall result is consequently an air pervious present invention adsorptive filtering material which compared with the prior art provides a significantly improved protective function in respect of chemical poison and warfare agent materials.

The perforations 4a and/or the perforations 4b independently of each other are round, more particularly circular, ellipsoidal, slotlike, rectangular or line shaped. In other words, the perforations 4a, 4b can be present in the form of round holes, more particularly circles, slots, ellipsoidal holes, rectangular holes or the like. And the perforations 4a, 4b can each be different in relation to the respective blocking layers 3a and 3b. However, it is similarly also possible in the context of the present invention for the perforations 4a and 4b to have different configurations in the respective blocking layers 3a and 3b themselves. As far as the introduction of the perforations 4a and 4b into the respective blocking layers 3a and 3b is concerned, this can be effected for example and nonlimitingly by irradiating, laser treatment or plasma treatment.

It will be found particularly advantageous according to the present invention when the perforations 4a and/or the perforations 4b—more particularly in the case of circular perforations—have a diameter of 1 to 10 000 µm, more particularly 1 to 1000 µm, preferably 5 to 750 µm, more preferably 10 to 500 µm, even more preferably 20 to 300 µm and yet even more preferably 50 to 200 µm.

In this context, it is possible for the perforations 4a and the perforations 4b independently of each other—more particularly in the case of slotlike or rectangular holes—to have a length and/or a width of 1 to 10 000 µm, more particularly 1 to 1000 µm, preferably 5 to 750 µm, more preferably 10 to 500 µm, even more preferably 20 to 300 µm and yet even more preferably 50 to 200 µm.

It will further be found advantageous according to the present invention when the total area of the perforations 4a based on the first blocking layer 3a and/or the total area of the perforations 4b based on the second blocking layer 3b independently of each other is at most 50%, more particularly at most 25%, preferably at most 10%, more preferably at most 5%, even more preferably at most 2% and yet even more preferably at most 1%. The total area of the perforations 4a or 4b relates in this connection to the sum total of the individual areas of the perforations in relation to the respective blocking layer 3a or 3b. The specific value for the total area of the perforations 4a or 4b ensures, on the one hand, that the present invention adsorptive filtering material 1 has a defined air perviousness and, on the other, that the blocking effect of the blocking layer 3a or 3b in relation to chemical poison and/or warfare agent materials as such is at least substantially maintained, resulting in a particularly good protective function in respect of chemical poison and/or warfare agent materials.

Particularly good results are obtainable when the area-based number of perforations 4a or perforations 4b independently of each other and based on the total area of the first blocking layer 3a or the second blocking layer 3b is 1 to 10 000 perforations/cm$^2$, more particularly 5 to 1000 perforations/cm$^2$, preferably 10 to 500 perforations/cm$^2$ and more preferably 15 to 300 perforations/cm$^2$.

As previously mentioned and as illustrated in FIG. 2, the perforations 4a and the perforations 4b are arranged relative to each other such that a lengthening and/or enlarging of the flow path through the present invention adsorptive filtering material 1 results and/or wherein a lengthened residence time results for the air, gases, aerosols or liquids or the like flowing through the adsorptive filtering material 1, and/or wherein a reduced flow rate results. FIG. 3 in this connection is an outline drawing of a regular/uniform arrangement of the perforations 4a and 4b, which results in an optimization in the sense of maximally enlarging the flow path through the adsorptive filtering material 1 of the present invention. According to FIG. 3, the perforations 4b positioned in the second blocking layer 3b are arranged such that, in the projection plane, in each case at least essentially identical separations or offsets A from the opposite and adjacent perforations 4a in the first blocking layer 3a result. However, the present invention is not limited to a uniform arrangement of the perforations 4a and 4b that is depicted in FIG. 3: similarly possible is an irregular arrangement of the perforations 4a and 4b and entailed thereby an irregular offset, with the proviso that overlaps of the perforations 4a, 4b shall be avoided, in which case a lengthening or enlarging of the flow paths or a lengthened residence time of the air/gases flowing through the adsorptive filtering material 1, and/or a reduced flow rate, is similarly realized.

It will be found particularly advantageous according to the present invention when the flow path and/or the residence time independently of each other is lengthened by at least 5%, more particularly by at least 10%, preferably by at least 15%, more preferably by at least 20%, even more preferably by at least 30% and yet even more preferably by at least 50%, and/or wherein the flow rate can be reduced by at least 5%, more particularly by at least 10%, preferably by at least 15%, more preferably by at least 20%, even more preferably by at least 30% and yet even more preferably by at least 50%. The aforementioned values can be obtained via a specific arrangement of the perforations 4a and 4b in the first blocking layer 3a and in the second blocking layer 3b, respectively, with the proviso that overlaps shall be avoided. In addition, the aforementioned values can similarly be obtained via the specific selection of the size, the areal fraction and/or the shape, more particularly in the previously defined ranges, of the perforations 4a, 4b. In this regard, a person skilled in the art is at all times able to elaborate the present invention adsorptive filtering material 1 such that the aforementioned values concerning the flow path and the residence time, or the flow rate, are realized.

As further illustrated by FIG. 2 and FIG. 3, the perforations 4a and the perforations 4b can each be arranged offset relative to each other such that the perforations 4a have an offset A, more particularly an at least essentially identical minimum offset A', in the projection plane from the respectively closest-lying or adjacent perforations 4b. The spacing or offset A/A' relates in this connection, as depicted in FIG. 3, to the edge spacing of the adjacent perforations 4a and 4b in the respective blocking layers 3a and 3b in the projection plane, again the view perpendicularly to the main extension plane being operative here.

"Adjacent" in relation to a first perforation in a blocking layer is to be understood as referring to the other perforations of the other blocking layer which are at least essentially immediately opposite, and surround, said first perforation in a blocking layer.

The term "separation" as used herein and as illustrated in FIG. 3 relates to that portion of a projection plane connecting line defined by the midpoints of perforations 4a, 4b that is not interrupted by said perforations 4a, 4b themselves. The offset or separation A between adjacent, opposite perforations 4a and 4b thus relates in the projection plane to the "edge to edge" separation of the perforations along a line defined by the midpoints of the respective perforations.

It is particularly advantageous in this regard when the offset A, as previously defined, is on average not less than 0.1 times, more particularly 0.2 times, preferably 1 times, more preferably 2 times, even more preferably 3 times the length or width of the reference perforations 4a, 4b, more particularly the diameter of the reference perforations 4a, 4b.

It will further be particularly advantageous when the offset A is chosen as a function of the thickness d or overall cross-sectional thickness of the adsorptive filtering material 1: Particularly good results are obtainable in this connection when the offset A is on average not less than at least 5%, more particularly at least 10%, preferably at least 30%, more preferably at least 50% and even more preferably at least 100% of the thickness d of the adsorptive filtering material 1. It is similarly envisionable in the context of the present invention to depart from the aforementioned values, if this is necessary for an intended use. For instance, it is also possible to realize an offset A of more than 100%.

Figure 4A:
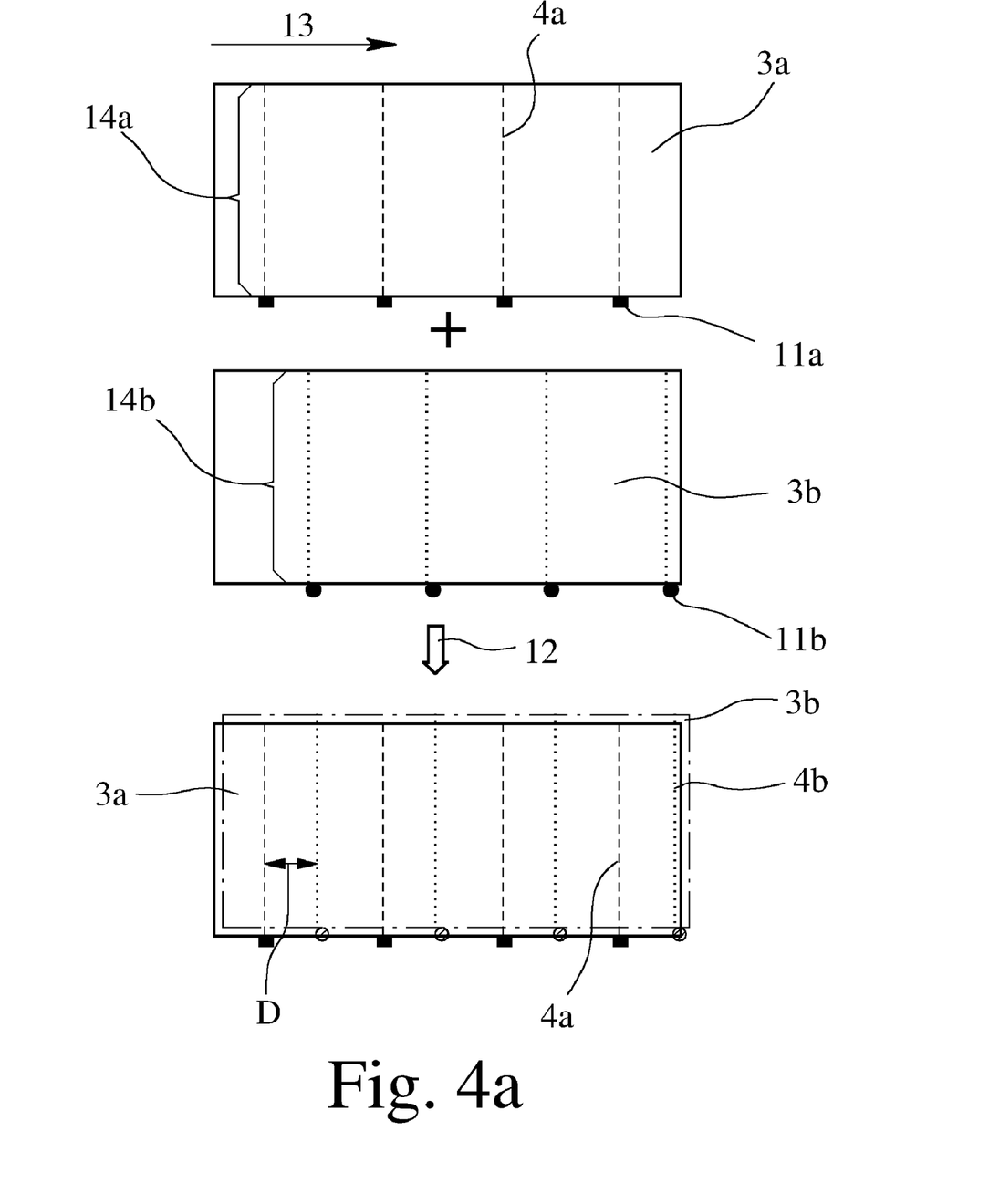
FIG. 4a shows a schematic depiction of the positioning of the perforations in the respective blocking layers and also the arrangement of the blocking layers to avoid the overlapping arrangement of the perforations in the projection plane.
Figure 4B:
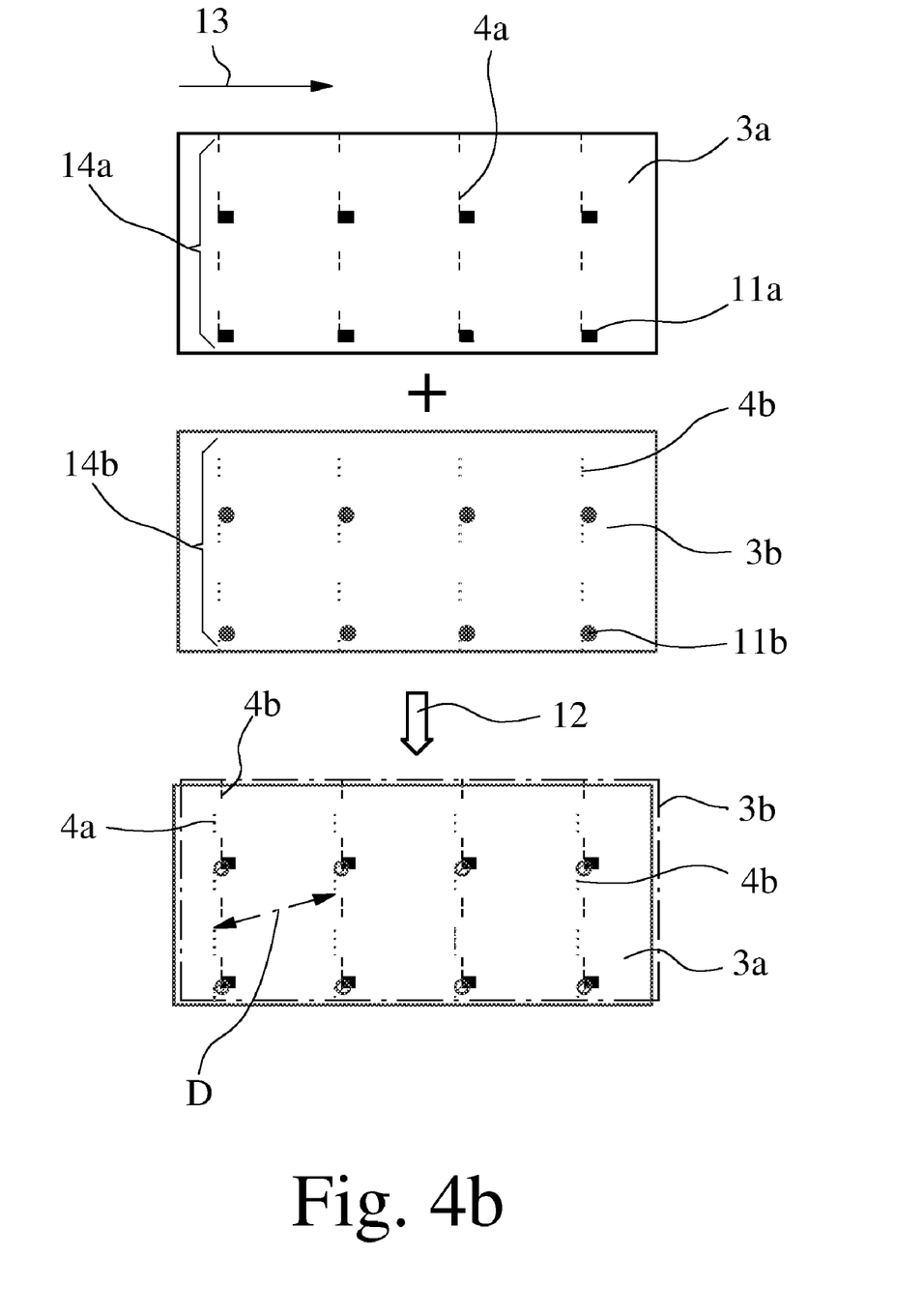
FIG. 4b shows a schematic depiction of the positioning of the perforations in the respective blocking layers as per an alternative embodiment and also the arranging of the blocking layers to avoid the formation of overlaps in respect of the perforations.

Further with regard to the arrangement of the perforations 4a and/or the perforations 4b, the perforations 4a and/or the perforations 4b—as shown in FIG. 4a and FIG. 4b—can be arranged in the first blocking layer 3a and the second blocking layer 3b, respectively, in the form of a regular repeat and/or in repeat groups 14a, 14b, more particularly in the form of lines, preferably straight lines, circles, ellipses or the like. This is advantageous particularly against the background that, more particularly in the course of the production of the present invention adsorptive filtering material 1, as will be described hereinbelow, a simplified arrangement of the respective blocking layers 3a, 3b is thereby made possible without the risk of overlaps or the like.

In this context, the perforations 4a and/or the perforations 4b can be arranged portionwise, for example in the form of line portions, circle portions or the like, within the respective repeat group 14a, 14b, as depicted in FIG. 4b. In this regard, the perforations 4a of a repeat group 14a can be arranged complementarily to the perforations 4b of the other repeat group 14b. This embodiment is depicted in FIG. 4b. In this regard, the perforations 4a and 4b in the respective repeat groups 14a and 14b are arranged complementarily in relation to the projection plane of the superposed blocking layers 3a and 3b. In relation to the present invention adsorptive filtering material 1, complete line-shaped or circle-shaped arrangements result for the perforations 4a and 4b in the projection plane without there being overlaps of the perforations 4a and 4b.

Such a portionwise arrangement of the perforations 4a and 4b likewise leads to production-specific advantages, since the blocking layers 3a and 3b can be arranged relative to each other in a simplified manner against the background of avoiding overlaps of the perforations 4a and 4b.

It is additionally preferable according to the present invention when the repeat groups 14a, 14b themselves are arranged offset relative to each other, more particularly in relation to the projection plane. It is thus possible according to the present invention for the repeat group 14a and the repeat group 14b to be arranged offset relative to each other such that the repeat group 14a has an offset B, more particularly an at least essentially identical minimum offset B', in the projection plane from the respectively closest repeat groups 14b, as depicted in FIG. 4b. In this context, the offset B here too relates to the projection plane onto the connecting line, not interrupted by the respective references, more particularly repeat groups, through the midpoints of said references, more particularly repeat groups, so that the "edge to edge" offset is again meant in relation to the spacing of the repeat groups 14a and 14b.

In this regard, the offset B may be on average not less than 0.1 times, more particularly 0.2 times, preferably 1 times, more preferably 2 times and even more preferably 3 times the length and/or width, more particularly the diameter, of the repeat groups 14a, 14b. In addition, the offset B may be on average not less than at least 5%, more particularly at least 10%, preferably at least 30%, more preferably at least 50% and even more preferably at least 100% of the thickness d of the adsorptive filtering material 1.

The first blocking layer 3a and/or the second blocking layer 3b independently of each other can be configured as foil, film or membrane. In this context, the first blocking layer 3a and/or the second blocking layer 3b independently of each other can be produced from a plastics material or polymer material, or comprise such, more particularly wherein the plastics material is selected from the group of polyolefins, polyamides, polyethers, polyesters, polyurethanes, polyether amides, polyester amides, polytetrafluoroethylenes and/or polymers or copolymers based on cellulose and also derivatives of the aforementioned compounds, more particularly wherein the blocking layer 3a and/or the blocking layer 3b independently of each other are a polyurethane-based membrane or a membrane based on polytetrafluoroethylene. In addition, the membrane may be in the form of an expanded membrane.

The material for the blocking layers 3a, 3b thus has the effect that the blocking layers 3a and 3b are essentially impervious to liquids, more particularly water and/or to aerosols, or at least retard their permeance, in their respective areas without perforations 4a and 4b respectively. The material for the blocking layers 3a and 3b is as such at least essentially water and air impervious but water vapor pervious, so that the blocking layers 3a, 3b are actually, in relation to their respective areas without perforations 4a and 4b, a continuous, more particularly uninterrupted membrane or foil or film. As previously indicated, the air or gas perviousness is achieved through the specific introduction of the perforations 4a, 4b into the blocking layers 3a, 3b, the introduction of perforations being well known per se to a person skilled in the art, so that no further observations are needed in this regard. The blocking layers 3a, 3b thus constitute such blocking layers to chemical poison and/or warfare agent materials as to prevent or at least retard their permeance. It is of advantage in this regard when the blocking layers 3a and 3b contain no or essentially no strongly hydrophilic groups, more particularly no hydroxyl groups. In this regard, the blocking layers 3a and 3b should contain weakly hydrophilic groups, more particularly polyether groups.

The blocking layers 3a and 3b may further be made self-adhesive, more particularly heat-tacky, so that the blocking layers 3a and 3b can at the same time serve as an adhesive layer for securing the adsorptive layer 5 and/or further layers, as defined hereinbelow.

It is thus preferable according to the present invention when the first blocking layer 3a and/or the second blocking layer 3b are, in relation to the respective area without perforations 4a, 4b and independently of each other, configured to be continuous, more particularly uninterrupted, and/or wherein the first blocking layer 3a and/or the second blocking layer 3b independently of each other may have a thickness of 1 to 500 µm, more particularly 1 to 250 µm, preferably 1 to 100 µm, more preferably 1 to 50 µm, even more preferably 2.5 to 30 µm and yet even more preferably 5 to 25 µm.

It is similarly a possibility according to the present invention that the blocking layer 3a and/or the blocking layer 3b independently of each other have a multilayered configuration, more particularly wherein the respective layers of the blocking layers 3a, 3b are identical or different and/or wherein the first blocking layer 3a and/or the second blocking layer 3b independently of each other are configured as a multilayered blocking layer laminate and/or as a multilayered blocking layer composite, more particularly wherein the blocking layer laminate and/or the blocking layer composite consist of at least two, preferably at least three interconnected layers or plies.

It is possible, for example, in this regard for the blocking layers 3a and 3b, independently of each other, to consist completely of polyurethane or to include a core layer comprising polyurethane. Similarly, the blocking layers 3a and 3b may, independently of each other, comprise a core layer based on a cellulose-based polymer and two outer layers, more particularly based on a polyurethane, on a polyether amide and/or on a polyester amide, which are connected to the core layer. In this regard, the cellulosic layer provides particularly good blocking-layer properties, while the polyurethane layers prevent any rustling and stabilize the cellulose layer.

As previously indicated, the blocking layers 3a and 3b can be configured independently of each other, so that an individual adaptation of the present invention adsorptive filtering material 1 in relation to the particular profile of requirements is possible. The present invention adsorptive filtering material 1 can thus be custom tailored against the background of its specific use. One possibility to be mentioned by way of example and in a nonlimiting manner is for the first blocking layer 3a, arranged for example in the donned state on the wearer-remote side of the present invention adsorptive filtering material 1, to be particularly rupture resistant and endowed with particularly good blocking properties against chemical poison and/or warfare agent materials, while in this case the second blocking layer 3b, which faces the wearer in the donned state, may be equipped with a particularly high perviousness to air, for example by the specific provision of larger perforations 4b.

As is exhaustively described hereinbelow, the blocking layers 3a and 3b can be applied to or laminated on an additional interlayer or carrier layer 6a or, respectively, 6b, as depicted in FIG. 1a, FIG. 1b and FIG. 2, more particularly in order that the stability or durability, more particularly the rupture resistance, of the blocking layers 3a and 3b in the manufacturing operation (for example in the course of the blocking layers 3a and 3b being printed with hot adhesive), as well as in use and/or in the donned state may be enhanced.

As previously indicated, the present invention adsorptive filtering material 1 includes as core layer so to speak an adsorptive layer 5 as depicted in FIG. 1, FIG. 1b and FIG. 2. The adsorptive layer 5 may have a discontinuous configuration. It is similarly possible for the adsorptive layer 5 to be configured as an adsorptive sheet filter. A combination of particulate adsorbents with an activated carbon sheet filter is also possible. As will be described hereinbelow, the adsorptive layer 5 may be fixed to a carrier layer or interlayer 6a or 6b, more particularly by means of an adhesive. In this case, the fixing with the preferably heat-tacky adhesive to the carrier layer 6a or, respectively, 6b is preferably effected by means of a punctiform application of the adhesive, ensuring good air perviousness or breathability for the present invention adsorptive filtering material 1 and also the ready accessibility to the adsorptive layer 5 by the air/gases flowing therethrough.

The adsorptive layer 5 may further be a material based on activated carbon, more particularly in the form of particles and/or fibers of activated carbon.

In this context, it can be contemplated according to the present invention that the adsorptive layer 5 comprises, as adsorptive material—as shown in FIG. 1b—discrete particles of activated carbon, preferably in granule form ("granulocarbon") or spherical form ("spherocarbon"), more particularly wherein the average diameter of the particles of activated carbon is more particularly <0.5 mm, preferably <0.4 mm, more preferably <0.35 mm, even more preferably <0.3 mm and yet even more preferably ≦0.25 mm, and/or wherein the average diameter of the particles of activated carbon is at least 0.1 mm.

It can additionally be contemplated that the adsorptive layer 5 comprises, as adsorptive material—as schematically depicted in FIG. 1a—fibers of activated carbon, more particularly in the form of an activated carbon fabric, more particularly wherein the activated carbon fabric has a basis weight of 20 to 200 $g/m^2$, more particularly 50 to 150 $g/m^2$, and/or more particularly wherein the activated carbon fabric is a woven, loop-formingly knitted, laid or bonded fabric of activated carbon, more particularly based on carbonized and activated cellulose and/or a carbonized and activated acrylonitrile.

Particularly good results are obtainable when the activated carbon has an internal surface area (BET) of at least 800 $m^2/g$, more particularly at least 900 $m^2/g$, preferably at least 1000 $m^2/g$ and more preferably in the range from 800 to 1500 $m^2/g$. This makes it possible to obtain particularly high adsorption capacities.

A further improvement in adsorption properties is obtainable when the adsorptive material of the adsorptive layer 5, more particularly the particles and/or fibers of activated carbon, is additionally impregnated with at least one catalyst, more particularly wherein enzymes and/or metal ions, preferably ions of copper, silver, cadmium, platinum, palladium, zinc and/or mercury, are used as catalyst, and/or more particularly wherein the amount of catalyst is 0.05% to 12% by weight, preferably 1% to 10% by weight, more preferably 2% to 8% by weight, based on the weight of the adsorptive layer 5.

As depicted in FIG. 1a, FIG. 1b and FIG. 2 and as indicated above, it can be contemplated according to the present invention that the present invention adsorptive filtering material 1 includes a first carrier layer or interlayer 6a arranged between the adsorptive layer 5 and the first blocking layer 3a and/or a second carrier layer or interlayer 6b arranged between the adsorptive layer 5 and the second blocking layer 3b.

As previously indicated, the interlayer 6a or 6b can on the one hand function as a backing/carrier for the adsorbents of the adsorptive layer 5 and, on the other, strengthen the blocking layer 3a or, respectively, 3b.

As far as the material of the interlayer 6a or 6b is concerned, it can be contemplated according to the present invention that the first interlayer 6a and/or the second interlayer 6b' independently of each other are a preferably air pervious textile material, more particularly a textile fabric, more particularly wherein the textile material is in each case a woven fabric, a loop-formingly knitted fabric, a loop-drawingly knitted fabric, a laid fabric, a nonwoven fabric, a layer of foamed plastic or a bonded textile fabric, and/or wherein the textile material may have a basis weight of 5 to 250 $g/m^2$, more particularly 10 to 200 $g/m^2$ and preferably 20 to 100 $g/m^2$, and/or more particularly wherein the first blocking layer 3a and/or the second blocking layer 3b independently of each other can be applied as a continuous layer on the respective interlayer 6a and/or the second interlayer 6b.

It can additionally be contemplated according to the present invention that the present invention adsorptive filtering material 1 includes a covering layer (not depicted in the figures) which in the donned state faces away from the wearer and is assigned to the first blocking layer 3a, more particularly wherein the covering layer may be a woven fabric, loop-formingly knitted fabric, loop-drawingly knitted fabric, laid fabric, nonwoven fabric or bonded textile fabric, and/or wherein the covering layer may have a basis weight of 20 to 200 g/m², more particularly 30 to 150 g/m² and preferably 50 to 120 g/m², and/or wherein the covering layer may be configured to be abrasion resistant and more particularly may consist of an abrasion-resistant textile material, and/or wherein the covering layer may be hydro- and/or oleophobicized and/or plasma treated.

By applying the covering layer it is possible to further improve the mechanical properties of the present invention adsorptive filtering material 1 in particular. More particularly, applying the covering layer protects more particularly the first blocking layer 3a from external agencies, more particularly mechanical agencies. In addition, the specific adjustment of the surface properties, for example as part of a hydrophobic and/or oleophobic treatment and/or a plasma treatment, makes it possible to further improve the protective properties in respect of chemical poison and warfare agent materials of the present invention adsorptive filtering material 1, since noxiants landing on the present invention adsorptive filtering material 1 already "bead off" at the surface and thus cannot or only to a lesser extent penetrate into the present invention adsorptive filtering material 1.

It can additionally be contemplated according to the present invention that the present invention adsorptive filtering material 1 includes an inner layer which in the donned state faces toward the wearer and is assigned to the second blocking layer 3b, more particularly wherein the inner layer is a woven fabric, loop-formingly knitted fabric, loop-drawingly knitted fabric, laid fabric, nonwoven fabric or bonded textile fabric, and/or wherein the covering layer has a basis weight of 5 to 75 g/m², more particularly 10 to 50 g/m² and preferably 15 to 30 g/m². This makes it possible to further improve the wearing comfort, for example when a particularly soft material is used for the inner layer.

The adsorptive filtering material 1 may further be present in the form of a loose assembly with regard to the respective layers, in which case it can be contemplated in this regard that the layers are merely fixed at the edge regions for example. However, it is additionally also possible for the individual layers, more particularly the first blocking layer 3a, the adsorptive layer 5 and the second blocking layer 3b of the adsorptive filtering material 1 of the present invention to be each interconnected and/or for the individual layers of the aforementioned kind of the adsorptive filtering material 1 of the present invention to form a composite, more particularly a laminate. This applies similarly to the arrangement whereby the present invention adsorptive filtering material 1 further comprises an inner layer and/or a covering layer, and/or additional interlayers 6a and/or 6b. Layered structures of this kind can also be present in the form of a loose assembly or as part of a composite, more particularly a laminate. It is similarly a possibility according to the present invention to connect only individual layers together in the manner of a composite. For instance, a composite can be formed from the adsorptive layer 5 and the blocking layers 3a and 3b together with any interlayers 6a and 6b arranged therebetween, which can then have applied to it an inner layer and/or a covering layer in a loose arrangement. Laminating the individual layers together can be effected in a manner known per se to a person skilled in the art, more particularly by means of a punctiform application of adhesive.

The present invention adsorptive filtering material 1 may further have a thickness d, or an overall cross-sectional thickness, of 0.1 mm to 20 mm, more particularly 0.5 mm to 15 mm, preferably 1 mm to 10 mm and more preferably 2 mm to 8 mm, and/or wherein the adsorptive filtering material 1 may have a basis weight of 50 to 1000 g/m², more particularly 75 to 750 g/m², preferably 100 to 550 g/m² and more preferably 150 to 450 g/m².

It is particularly advantageous when the present invention adsorptive filtering material 1 has a water vapor transmission rate of at least 15 l/m² per 24 h, more particularly at least 20 l/m² per 24 h and preferably at least 25 l/m² per 24 h at 25° C. and at a thickness of the blocking layers 3a, 3b of 50 μm each, and/or wherein the adsorptive filtering material 1 should have a water vapor transmission resistance $R_{et}$ under steady state conditions, measured according to DIN EN 31 092:1993 (February 1994) and the international standard ISO 11 092, at 35° C. of at most 25 (m²·pascal)/watt, more particularly at most 20 (m²·pascal)/watt, preferably at most 13 (m²·pascal)/watt at a thickness of the blocking layers 3a, 3b of 50 μm each, and/or wherein the adsorptive filtering material 1 should have a barrier effect in respect of chemical warfare agents, more particularly bis[2-chloroethyl]sulfide (mustard gas, Hd, Yellow Cross), measured in the diffusive flow test, permitting a permeance of at most 4 μg/cm² per 24 h, more particularly at most 3.5 μg/cm² per 24 h, preferably at most 3.0 μg/cm² per 24 h and even more preferably at most 2.5 μg/cm² per 24 h, at a thickness of the blocking layers 3a, 3b of 50 μm each. The diffusive flow test is known as such to a person skilled in the art. In addition, the diffusive flow test is further specified in the context of the illustrative embodiments.

It is further advantageous according to the present invention when the adsorptive filtering material 1 of the present invention is gas pervious, more particularly air pervious, more particularly wherein the gas or air perviousness of the present invention adsorptive filtering material 1 is at least 10 $l \cdot m^{-2} \cdot s^{-1}$, more particularly at least 30 $l \cdot m^{-2} \cdot s^{-1}$, preferably at least 50 $l \cdot m^{-2} \cdot s^{-1}$, more preferably at least 100 $l \cdot m^{-2} \cdot s^{-1}$ and even more preferably at least 400 $l \cdot m^{-2} \cdot s^{-1}$, and/or up to 10 000 $l \cdot m^{-2} \cdot s^{-1}$ at a flow resistance of 127 Pa, and/or wherein the adsorptive filtering material 1 of the present invention should have a water vapor transmission rate of at least 5 l/m² per 24 h, more particularly at least 10 l/m² per 24 h, preferably at least 15 l/m² per 24 h, more preferably at least 20 l/m² per 24 h and even more preferably at least 25 l/m² per 24 h.

The present invention also comprises embodiments wherein a plurality of adsorptive filtering materials 1 of the present invention are arranged in series, for example to form high-performance filtering systems.

The present invention further provides—in accordance with a second aspect of the present invention—a process for producing the adsorptive filtering material 1 of the present invention wherein at least one first blocking layer 3a that includes a multiplicity of perforations 4a and at least one second blocking layer 3b that includes a multiplicity of perforations 4b and also an adsorptive layer 5 arranged between the first blocking layer 3a and the second blocking layer 3b are combined, more particularly connected, preferably by lamination, with each other to form an adsorptive filtering material 1, wherein the first blocking layer 3a and the second blocking layer 3b are arranged such that the perforations 4a of the first blocking layer 3a and the perforations 4b of the second blocking layer 3b are nonoverlapping and/or noncongruent. The measures to be carried out in this regard are well known to a person skilled in the art, so that no further observations are required on this.

The process of the present invention is additionally characterized in that—as depicted in FIGS. 4a and 4b—the first blocking layer 3a and the second blocking layer 3b may each be provided with markings 11a, 11b, in the form of colored imprints for example, wherein the markings 11a, 11b permit a preferably visually capturable positional determination of the perforations 4a, 4b, more particularly so that in the course of the production of the adsorptive filtering material 1 the markings 11a, 11b are used to avoid any overlapping and/or congruence of the perforations 4a, 4b, more particularly an offset and/or spacing of the perforations 4a, 4b can be achieved in a specific manner. This is depicted in FIG. 4a and FIG. 4b wherein the respective regions featuring the perforations 4a, 4b, or repeat groups 14a, 14b of perforations 4a, 4b, are marked by markings 11a, lib, so that visual control concerning the arrangement of blocking layers 3a and 3b in relation to the layered structure of the present invention adsorptive filtering material 1 is always ensured—even in the case of very small sizes for the perforations 4a, 4b or in the case of low areal density of the perforations 4a, 4b—insofar as overlaps in respect of the perforations of the respective blocking layers are avoided. In FIGS. 4a and 4b, the arrow 12 illustrates the step of superposing the blocking layers with regard to the projection plane, with the blocking layers as such being arranged comparably to the arrangement in the present invention adsorptive filtering material 1. Further layers are omitted in FIGS. 4a and 4b (for simplicity) in order that the principle of the overlap-free arrangement of the perforations 4a and 4b in the projection plane may be illustrated. FIG. 4a and FIG. 4b further illustrate that the perforations 4a, 4b, or the repeat groups 14a, 14b, can extend more particularly transversely to the spreading direction 13 of the blocking layers 3a, 3b, which in the case of a roll material for example can be the machine or withdrawal direction.

The present invention also provides—in accordance with a third aspect of the present invention—protective materials, more particularly for the civilian or military sector, more particularly protective apparel, such as protective suits, protective gloves, protective footwear, protective socks, protective headwear and the like, and also protective coverings, such as tents, sleeping bags, preferably all aforementioned protective materials for NBC deployment, produced using an adsorptive filtering material according to the present invention and/or including the adsorptive filtering material according to the present invention.

The present invention yet further provides—in accordance with a fourth aspect of the present invention—filters and filtering materials, more particularly for removing noxiant, odorant and toxicant materials of any kind, more particularly from air and/or gas streams, such as NBC protective mask filters, odor filters, sheet filters, air filters, more particularly filters for indoor air cleaning, adsorption-capable backing structures and filters for the medical sector, produced using an adsorptive filtering material according to the present invention and/or including an adsorptive filtering material according to the present invention.

The present invention further provides—in accordance with a fifth aspect of the present invention—for the use of the present invention adsorptive filtering material, as described above, in the manufacture of protective apparel, more particularly for the civilian or military sector, such as protective suits, protective gloves, protective footwear, protective socks, protective headwear and the like, and of protective coverings of any kind, preferably all aforementioned protective materials for NBC deployment.

The present invention finally also provides—in accordance with a sixth aspect of the present invention—for the use of an adsorptive filtering material according to the present invention, as previously defined, for producing filters and filtering materials of any kind, more particularly for removing noxiant, odorant and toxicant materials of any kind, more particularly from air and/or gas streams, such as NBC protective mask filters, odor filters, sheet filters, air filters, more particularly filters for indoor air cleaning, adsorption-capable backing structures and filters for the medical sector.

Therefore, the present invention altogether succeeds in providing, for the first time, an adsorptive filtering material which owing to a high air perviousness ensures a high wearing comfort even under extreme conditions and also has excellent properties with regard to an effective protection against chemical poison and warfare agent materials, so that the adsorptive filtering material of the present invention is suitable for military deployment in particular.

Further elaborations, modifications and variations of the present invention will become apparent to and realizable by the ordinarily skilled after reading the description without their having to go outside the realm of the present invention.

The present invention is illustrated by the following operative example which does not restrict the present invention in any way, however.

Operative Example

Ten different adsorptive filtering materials are produced:

First, a comparative adsorptive filtering material (example No. 1) which includes an adsorptive layer enclosed between two perforate blocking layers, one on each side. The blocking layers include perforations having a diameter of 100 µm (circularly round perforations), the total area of the perforations based on the respective blocking layers being 0.5%. The distribution of the perforations and also the arrangement of the blocking layers in the adsorptive filtering material is adventitious, so that the material as per comparative example No. 1 has, in the projection plane, perforations with overlaps.

True, the inventive examples No. 2 to No. 4 likewise have perforations with diameters of 100 µm totaling about 0.5% in area based on the blocking layers. However, in a profound difference to comparative example No. 1, the adsorptive filtering material as per examples No. 2 to No. 4 is produced such that the opposite perforations of the respective blocking layers have no overlaps in the projection plane, and in addition the spacing or offset between the adjacent opposite perforations being on average controlled 0.1 times the diameter of the perforations for inventive example No. 2, 1 times the diameter of the perforations for inventive example No. 3 and 1.5 times the diameter of the perforations for inventive example No. 4.

The results which follow relate to the protective function against chemical warfare agent materials (specifically mustard gas here), the tests being carried out by means of the standardized Laid Drop Diffusive Flow Test. To this end, the adsorptive filtering materials (specimen area: 10 cm$^2$ in each case) are clamped in a test cell over a PE membrane (10 µm), which simulates the human skin, and drops of warfare agent material (mustard gas in this case, eight drops of mustard gas of 1 µl each in volume per 10 m$^2$) are applied to the upper material using a cannula. The air stream underneath the specimen is sucked through a wash bottle. After the test, the cumulative breakthrough is measured in µg/m$^2$ by means of gas chromatography; the minimum requirement is a value of <4 µg/m² (test conditions: relative humidity<5%, temperature 30° C., 6 l/s air stream under the specimen, 24 h test duration). This test simulates the diffusion of liquid warfare agent material through the adsorptive filtering material without convection and in the process simulates the flat contact area of protective apparel on the skin, the latter being simulated by the PE membrane. The limit of detection with this method is about 0.05 µg/m².

Table 1 shows the results obtained in this regard for comparative example No. 1 and for inventive examples Nos. 2 to 4.

TABLE 1

| | Example No. | | | |
|---|---|---|---|---|
| | 1 | 2 | 3 | 4 |
| Mustard gas diffusion test/cumulative breakthrough [µg/cm²] | 4 | 3.2 | 2.9 | 2.7 |

The test results show that the protective function of the present invention adsorptive filtering materials featuring the specific arrangement of perforations with avoidance of overlaps is significantly improved compared with the noninventive example featuring the adventitious arrangement of perforations, which documents the superior efficacy of the present invention adsorptive filtering material with regard to the protective function against chemical poison and warfare agent materials.

In what follows, the diffusive flow test is carried out on three further inventive adsorptive filtering materials (examples Nos. 5 to 7), the inventive adsorptive filtering materials as per examples Nos. 5 to 7 having perforations 1000 µm in diameter (circularly round perforations). The spacing was chosen in accordance with inventive examples 2 to 4 between 0.1 times and 3 times the diameter of the perforations: The spacing was 0.1 times the diameter of the perforations in example No. 5, 1 times the diameter of the perforations in example No. 6 and 1.5 times the diameter of the perforations in example No. 7. Table 2 shows the results determined in this regard:

TABLE 2

| | Example No. | | |
|---|---|---|---|
| | 5 | 6 | 7 |
| Mustard gas diffusion test/cumulative breakthrough [µg/cm²] | 3.8 | 3.4 | 3.1 |

This test series illustrates that—even though the diameter of the perforations is 10 times larger than in the comparative example—significantly better values are still achieved in respect of the blocking function against chemical poison and/or warfare agent materials.

A conclusive test series was conducted by producing inventive adsorptive filtering materials (examples Nos. 8 to 10) which differ from the aforementioned examples in that the circularly round perforations of the blocking layers have a diameter of 200 µm and make up a total area amounting to about 1.5% of the blocking layers. The spacing or offset between the perforations of the one blocking layer and the respectively nearest perforations of the other blocking layer in the projection plane was controlled such for inventive examples 8 to 10 that the offset amounts to 10% (example No. 8) of the thickness of the adsorptive filtering material, 30% of the thickness of the adsorptive filtering material (example No. 9) and 50% of the adsorptive filtering material (example No. 10). The results determined are listed below in Table 3:

TABLE 3

| | Example No. | | |
|---|---|---|---|
| | 8 | 9 | 10 |
| Mustard gas diffusion test/cumulative breakthrough [µg/cm²] | 2.9 | 2.1 | 1.3 |

This test series shows that a further improvement in the protective function against chemical poison and/or warfare agent materials results on spacing the perforations in the aforementioned manner as a function of the thickness of the adsorptive filtering material of the present invention. The results altogether document the outstanding protective function of the adsorptive filtering material of the present invention compared with the prior art.

What is claimed is:

1. An adsorptive filtering material of multilayered construction, the adsorptive filtering material comprising a permeable adsorptive blocking layer composite,
   wherein the adsorptive filtering material includes
   (i) at least one first blocking layer that includes a multiplicity of perforations;
   (ii) at least one second blocking layer that includes a multiplicity of perforations; and
   (iii) an adsorptive layer arranged between the first blocking layer and the second blocking layer;
   wherein the first blocking layer and the second blocking layer, independently of each other, are produced from a plastics material or polymer material and configured as foil, film or membrane; and
   wherein the first blocking layer and the second blocking layer are arranged such that the perforations of the first blocking layer and the perforations of the second blocking layer are non-overlapping and/or non-congruent.

2. The adsorptive filtering material of claim 1, wherein the perforations of the first blocking layer and the perforations of the second blocking layer are arranged non-overlappingly and/or non-congruently and/or offset relative to each other in the projection plane.

3. The adsorptive filtering material of claim 1, wherein the total area of the perforations based on the first blocking layer and the total area of the perforations based on the second blocking layer, independently of each other, is at most 50%.

4. The adsorptive filtering material of claim 1, wherein the total area of the perforations based on the first blocking layer and the total area of the perforations based on the second blocking layer, independently of each other, is at most 25%.

5. The adsorptive filtering material of claim 1, wherein the area-based number of perforations of the first blocking layer and the area-based number of the perforations of the second blocking layer, independently of each other and each based on the total area of the first blocking layer or the second blocking layer, respectively, is from 1 to 10,000 perforations/cm².

6. The adsorptive filtering material of claim 1, wherein the perforations of the first blocking layer and the perforations of the second blocking layer are arranged offset relative to each other such that the perforations of the first blocking layer have an offset (A) in the projection plane from the respectively closest perforations of the first blocking layer, wherein the offset (A) is on average not less than 0.1 times the length and/or width of the reference perforations.

7. The adsorptive filtering material of claim 1, wherein the perforations of the first blocking layer and the perforations of the second blocking layer are arranged offset relative to each other such that the perforations of the first blocking layer have an offset (A) in the projection plane from the respectively closest perforations of the first blocking layer, wherein the offset (A) is on average not less than at least 5% of the thickness of the adsorptive filtering material.

8. The adsorptive filtering material of claim 1, wherein the perforations of the first blocking layer and the perforations of the second blocking layer, independently of each other, are arranged in the form of a regular repeat and/or in repeat groups.

9. The adsorptive filtering material of claim 1, wherein the perforations of the first blocking layer and the perforations of the second blocking layer, independently of each other, are arranged in the form of a regular repeat and/or in repeat groups, wherein the perforations of the first blocking layer and the perforations of the first blocking layer, independently of each other, are arranged portionwise within the respective repeat group, wherein the perforations of the first blocking layer of one repeat group are arranged complementarily to the perforations of the second blocking layer of the other repeat group.

10. The adsorptive filtering material of claim 1, wherein the plastics material is selected from the group of polyolefins, polyamides, polyethers, polyesters, polyurethanes, polyether amides, polyester amides, polytetrafluoroethylenes and polymers or copolymers based on cellulose and mixture of the aforementioned compounds.

11. The adsorptive filtering material of claim 1, wherein the first blocking layer and the second blocking layer, independently of each other, are a polyurethane-based membrane or a membrane based on polytetrafluoroethylene.

12. The adsorptive filtering material of claim 1, wherein the first blocking layer and the second blocking layer are, in relation to the respective area without perforations and independently of each other, configured to be continuous or uninterrupted.

13. The adsorptive filtering material of claim 1, wherein the first blocking layer and the second blocking layer, independently of each other, have a thickness of 1 to 500 μm.

14. The adsorptive filtering material of claim 1, wherein the adsorptive layer is configured to be discontinuous.

15. The adsorptive filtering material of claim 1, wherein the adsorptive filtering material includes a first interlayer arranged between the adsorptive layer and the first blocking layer and/or a second interlayer arranged between the adsorptive layer and the second blocking layer.

16. A process for producing the adsorptive filtering material as defined in claim 1,
wherein (i) at least one first blocking layer that includes a multiplicity of perforations and (ii) at least one second blocking layer that includes a multiplicity of perforations and (iii) an adsorptive layer arranged between the first blocking layer and the second blocking layer are combined by lamination with each other to form an adsorptive filtering material;
wherein the first blocking layer and the second blocking layer, independently of each other, are produced from a plastics material or polymer material and configured as a foil, film or membrane; and
wherein the first blocking layer and the second blocking layer are arranged such that the perforations and the perforations are non-overlapping and/or non-congruent.

17. Protective materials for the civilian or military sector, selected from the group consisting of protective apparel, protective suits, protective gloves, protective footwear, protective socks, protective headwear, protective coverings, tents and sleeping bags, wherein the protective materials comprise an adsorptive filtering material as defined in claim 1.

18. Filters and filtering materials for removing noxiant, odorant and toxicant materials from air and/or gas streams, selected from the group consisting of NBC protective mask filters, odor filters, sheet filters, air filters, filters for indoor air cleaning, adsorption-capable backing structures and filters for the medical sector, wherein the filters and filtering materials comprise an adsorptive filtering material as defined in claim 1.

* * * * *